United States Patent [19]
Zhang et al.

[11] Patent Number: 5,853,810
[45] Date of Patent: Dec. 29, 1998

[54] METHOD OF PREVENTING STATICS FOR SPACE STRUCTURE

[75] Inventors: Feng Zhang; Mengqi Yu, both of Shanghai, China

[73] Assignee: Baoshan Iron and Steel (Group) Corporation, Shanghai, China

[21] Appl. No.: 793,686

[22] PCT Filed: Sep. 12, 1995

[86] PCT No.: PCT/CN95/00073

§ 371 Date: Mar. 10, 1997

§ 102(e) Date: Mar. 10, 1997

[87] PCT Pub. No.: WO96/08620

PCT Pub. Date: Mar. 21, 1996

[30] Foreign Application Priority Data

Sep. 12, 1994 [CN] China ............................ 94 1 15525.0

[51] Int. Cl.⁶ .............................. B05D 1/38; B05D 3/12; B05D 5/12
[52] U.S. Cl. ..................... 427/407.1; 427/356; 427/369; 427/379; 427/407.2; 427/408
[58] Field of Search ................................ 427/403, 407.1, 427/407.2, 408, 165, 168, 379, 356, 369, 421, 428, 429; 252/500

[56] References Cited

U.S. PATENT DOCUMENTS

| | | | |
|---|---|---|---|
| 3,728,205 | 4/1973 | Brindell et al. | |
| 3,801,418 | 4/1974 | Cornelis et al. | 427/164 |
| 4,064,074 | 12/1977 | Ellis | 252/506 |
| 4,554,094 | 11/1985 | Bäbler et al. | 252/519.2 |
| 4,639,379 | 1/1987 | Asai et al. | 427/322 |
| 4,770,916 | 9/1988 | Leukel et al. | 427/126.1 |
| 4,826,912 | 5/1989 | Ko et al. | 524/567 |
| 4,872,910 | 10/1989 | Eshleman et al. | 106/3 |
| 4,950,423 | 8/1990 | Sullivan | 252/514 |
| 5,447,564 | 9/1995 | Xie et al. | 252/500 |
| 5,516,546 | 5/1996 | Hari et al. | 427/122 |
| 5,683,747 | 11/1997 | Hamon | 427/203 |

FOREIGN PATENT DOCUMENTS

| | | |
|---|---|---|
| 2104895 U | 5/1992 | China . |
| 2110046 U | 7/1992 | China . |
| 59-138267 | 8/1984 | Japan . |
| 63-295795 | 12/1988 | Japan . |
| 1-282400 | 11/1989 | Japan . |
| 3-93942 | 4/1991 | Japan . |
| 2082649 | 3/1982 | United Kingdom . |
| WO 92/13648 | 8/1992 | WIPO . |

OTHER PUBLICATIONS

"Antistatic Technique For Program–Controlled Exchange Computer Room", China Postal Communications Design Technology, 91(5) (No Date).

David Carlton, "Eliminating ESD in the Workstation", Electronic Packaging & Production, pp. 78–81, Nov. 1990.

*Primary Examiner*—Diana Dudash
*Attorney, Agent, or Firm*—Panitch Schwarze Jacobs & Nadel, P.C.

[57] ABSTRACT

The present invention is directed to an in-house space antistatic & static electricity leakage method, comprising that multilayer different antistatic materials coated onto walls, ceilings, ground and glass doors, or windows so as to achieve the automatic compensation of antistatic action, wherein wall, ceiling and ground each is composed of base layer, interlayer and top layer. Said base layer is filled up using filling material containing antistatic material, scraped smooth, and compacted for 1–3 times; the interlayer can be coated with a thickness of 0.3–2 mm with antistatic interlayer material having decorative effect for 1–3 times. The top layer is coated 0.1–0.4 mm thick with antistatic covering material for 2–3 times. The glass door or window is coated with a thickness of 0.1–0.3 mm with transparent antistatic material for 2–8 times.

9 Claims, No Drawings

METHOD OF PREVENTING STATICS FOR SPACE STRUCTURE

TECHNICAL FIELD

The present invention involves a method of preventing statics for space structure and a method of preventing the occurrence of in-house static electricity and to speed up the static electricity release and leakage therefrom. The present invention may be used for electronic element workshops, electrical appliance control rooms, command and control centers, and other cases requiring antistatic and static electricity-releasing performances such as space aeronautics and aviation, military projects, subway controls, medical therapeutics and sanitation, light industry and printing, film production, program controlled communications, bank and finance, stock and credit company, broadcasting and television, guest house and homes etc., add especially the computer room of the computer system projects.

TECHNICAL BACKGROUND

For the time being, the existing in-house antistatic technique mainly uses grounded housing of the installations, or sometimes single body apparatus so that they can be temporarily grounded during operation, and once out of operation, they will be ungrounded. In November, 1991, U.S. EP&P(Electronic packaging &. production) proposed that an ideal antistatic work platform be required, the designing of which means to control the electrostatic thereof to be 50 volts. Some others use antistatic floors, carpets or static-preventive clothing, wrist guards etc. These approaches are but point, area, or single body appliances for releasing the static electricity of their own using metallic electronic conduction, unfavorable to uses for indoor spaces of higher antistatic specifications such as computer rooms, space aeronautics &. aviation, subway control, bank &. finance, stock & credit companies, military projects etc. Chinese Patent Application CN1073315A discloses a "Method of indoor space electrostatic prevention". It makes use of antistatic wall paper, antistatic ceilings, antistatic floors as well as the anti-static release networks which are combined for the purpose of indoor electrostatic release and leakage, but said method is of certain difficulty during construction, because under some circumstances, antistatic wall paper is not suitable for use, sometimes wall paper of larger areas will be damaged by friction to reduce the electrostatic release and leakage effect, further, the antistatic treatment on glass doors or windows, ceilings, and ground, and the formed space is not mentioned either therein.

SUMMARY OF THE INVENTION

The object of the present invention is to achieve an optimal electrostatic preventive effect of bulk spaces by means of using multilayer coating antistatic materials on the wall, the ground and the ceiling as well as the antistatic material coating on glass door or windows.

For the above-indicated objective, the present invention is embodied as follows: multilayer different antistatic materials are coated on walls, floors, ceilings and glass doors or windows to constitute a fully ionized antistatic bulk space to achieve the automatic compensation for electrostatic preventive and antistatic effect for the bulk space wherein 1. walls, ceiling, and ground are all composed of base layer, interlayer and top layer:
   ① base layer: first the skinny fluff and the dirt are removed from the surface, then the unsmooth portions thereof are made smooth by filling the antistatic material thereinto; after a duration of 5–10 hours for drying, the entire surface of the base layer is scraped and pressed smooth and compacted for 1–4 times as required;
   ② interlayer: antistatic inter-coating material is brush-coated, roll-coated or spray-coated with a thickness of 0.3–2 mm therefor; after a duration of 5–26 hours, brush-coated, roll-coated or spray-coated for another 1–4 times as necessary, and then the interlayer is completed;
   ③ top layer: 0.1–0.4 mm thick antistatic top or covering material is brush-coated, roll-coated or spray-coated thereon; after a duration of 2.5–8 hours for drying, brush-coated, roll-coated or spray-coated another 2–5 times as necessary, and the top layer is completed.

2. glass doors or windows: 0.1–0.3 mm thick transparent antistatic material is brush-coated, roll-coated or spray-coated as required; after a duration of 1–3 hours for drying, brush-coated, roll-coated or spray-coated 2–8 times as required and the procedure is completed.

DESCRIPTION OF THE PREFERRED EMBODIMENTS OF THE PRESENT INVENTION

The followings is detailed description on the present invention.

1. coating method of antistatic material for wall
   ① base layer: first remove by chisel the old outerskin, dust, spots, oil dirt etc. from the wall, then use cotton filaments and dust-cleaner to remove the powders left there, and smoothen the unsmooth portions thereof by filling the antistatic material composed of 15–30 (weight) % acrylic acid emulsion, 4–6 (weight) % HOA amide antistatic agent, 8–12(weight) % gypsum powder, and 53–73 (weight) % white cement. The HOA amide antistatic agent is a known antistatic agent, commercially available in China, wherein "HOA" means "highly operative amide." Examples of HOA amide are coconut oil alcohol acylamide and dodecylyediethanol amide, 1:2 type. Adding gypsum powder thereinto is for the purpose of softening the scrape layer so it can be easily be ground and smoothened; after a duration of 5–8 hours, the antistatic performance of the filling material will drop somewhat due to the interaction between the filling material and the existing static electricity on the wall. In order to compensate this lowering of the antistatic performance and reduce the color difference and the unsmoothness thereof, another 1–3 times of filling smooth, full scrape, brush-coat, roll-coat, and spray-coat can be carried out therefor.
   ② interlayer: homogeneously brush-coat, roll-coat or spray-coat on the base layer a colour antistatic interlayer wall material, the ingredients (wt %) of which read: ethylene glycol 6–11, sodium hexametaphosphate 5–10, talc powder 25–27,HOA amide antistatic agent 4–5, color pulp 1–3, styrene-acrylic emulsion 54–55, said material should closely combine with the base layer. The thickness of the first coating layer is 0.2–0.4 mm; after a duration of 6–8 hours for drying, the second layer can be sprayed thereonto with a thickness of 0.1–0.3 mm, and if necessary, it can be sprayed for another 1–2 times.
   ③ top layer: a transparent antistatic material is used as the top material, the ingredients (wt %) of which read:

triethanolamine 1–6, gasoline 45–70, HOA amide antistatic agent 3–4, and silicon-acrylic resin base material 20–51. Homogeneously brush-coat, roll-coat or spray-coat a coating layer 0.3–0.4 mm thick, the surface of which is required to be bright and smooth. After a duration of 6–8 hours for drying, spray-coat another coating layer with a thickness of 0.1–0.3 mm, and if necessary, another 1–2 layers can be brush-coated, roll-coated or spray-coated.

The antistatic material coating layer thus obtained for wall has the desired color and a bright and smooth surface; when the said surface is damaged, an antistatic automatic compensation can be achieved.

2. Coating method of antistatic material for ceiling

① base layer: same as the method for the base layer of the wall.

② interlayer: a coating layer with thickness of 1–2 mm is homogeneously brush-coated, roll-coated, or spray-coated, using antistatic interlayer ceiling material the ingredients (wt %) of which read: EVA (ethylene-vinyl acetate) 25–30, HOA amide antistatic agent 3–4, ethylene glycol 1–5, aqueous solution of polymethylacrylic acid ammonium 1–6, silicon sand (30–100 mesh) 38–50, and pure water 20–24. After a duration of 12–26 hours for drying, the interlayer is readily completed.

③ top layer: same as the method for the wall.

The antistatic material coating layer used for ceiling obtained by the above-indicated method possesses sandy wall shape, and anti-combustion and sound-absorbing effect. Meanwhile it can embody the automatic compensation of antistatic performance.

3. Coating method of antistatic material for ground

① base layer: first clean away the oil and dirt on the ground, remove the fluff and spots thereof, and scrape smooth the unsmooth portions by chisel etc., then fill up and fully scrape the antistatic ground filling material the ingredients (wt %) of which read: acrylic acid for bottom sealing material 13–27, adhesive 107 8–12, white cement 57–73, and HOA amide antistatic agent 4–6. The main ingredient of Adhesive 107 is polyvinyl formal. After a duration of 5–10 hours for drying, the antistatic performance of the said material will drop somewhat due to the neutralization and the leakage of the initial ground polluted by static electricity. In order to compensate the antistatic performance thereof and to achieve the equilibrium of the antistatic performance of the material, the same procedure can be made once more using same filling material and after a duration of 5–10 hours for drying, the sand paper can be used for grinding smooth. If required, the entire above-indicated process can be repeated to scrape smooth and to compact at least once more.

② interlayer: homogeneously brush-coat, roll-coat or spray-coat a coating layer with a thickness of 0.5–1 mm using antistatic interlayer material for ground the ingredients (wt %) of which read: acrylic acid resin 90–95, HOA amide antistatic agent 10–5; after a duration of 5–7 hours, said interlayer material is made to be closely with the ground base layer, then a layer with a thickness of 0.3–0.5 mm is again homogeneously brush-coated, roll-coated or spray-coated and then dried for 5–7 hours.

③ top layer: a layer with a thickness of 0.1–0.2 mm is homogeneously brush-coated, roll-coated, or spray-coated using antistatic covering material for ground the ingredients (wt %) of which read: above 20% pure acrylic acid 93–95 and HOA amide antistatic agent 5–7. After a duration of 2.5–3.5 hours for drying to achieve a close combination with the interlayer through permeation, the said material is again homogeneously brush-coated, roll-coated, or spray-coated with a thickness of 0.1–0.2 mm at least one time.

4. Coating of the antistatic material for glass door or window

A layer with a thickness of 0.1–0.3 mm is homogeneously brush-coated and spray-coated using transparent antistatic material, the ingredients (wt %) of which read: triethanolamine 1–5, gasoline 45–70, HOA antistatic agent 3–4, and silicon-acrylic resin base material 20–51. After a duration of 1–3 hours for drying, another thickness of 0.2–0.3 mm is again brush-coated or spray-coated. After a duration of 1–3 hours for drying, some more layers can be further brush-coated or spray-coated suitably as required. When a certain transparency effect of glass is required, said material is brush-coated around 0.1 mm–0.2 mm. When the frosted glass effect is required, a thickness of 0.2–0.3 mm is homogeneously spray-coated to be thinner and smooth. After a duration of 1–3 hours for drying, a second layer with a thickness of above 0.2–0.3 mm can be spray-coated, and a thickness of 2–6 layers can be increased as required.

In order to further realize the present invention, antistatic complex floor can be further fitted and buried on or in the ground coated with several layers of antistatic material. Said floor is composed of base sheet enclosed by upper and lower network-and sheet-like metal materials with a thickness of 0.1–1 mm such as aluminum alloy. An antistatic adhesive material having a thickness of 0.5–3 mmn is further stuck to the upper surface of the floor. Through holes are homogeneously distributed on the base sheet, which are filled with; antistatic rubber bars or metal materials, and the lower side of the floor is the support. The space formed by said floor and ground may be used as the air-conditioning wind depot, or for laying the cables, the captans etc., as the friction of the air-conditioning wind will result in a great amount of static electricity to be accumulated thereonto, using the space antistatic system composed of the ground and the floor according to the present invention can form antistatic "underground wind depot" or "antistatic underground space layer for laying the cables".

Meanwhile, using a system merely treated by wall antistatic material can form a "space antistatic ring", using a system merely treated by ceiling antistatic material can form a "space antistatic roof", using merely antistatic glass to manufacture doors, windows, walls, the antistatic glass doors or windows and the antistatic walls can form "ring type space antistatic system". Glass doors or windows and glass walls etc. of antistatic treatment can also be separately and individually used.

A combination of antistatic wall with antistatic floor can readily form a "space antistatic coverage"; a combination of antistatic wall with antistatic ground can readily form a "pit-type space antistatic system"; and a combination of antistatic ceiling with antistatic floor can readily form a "capacitor type antistatic system".

For the bulk space antistatic method according to the present invention, the base layer coated with several laminations of antistatic materials is non-metallic material such as glass, cement, concrete, white washed wall etc.

The transparent antistatic material according to the method of the present invention, when 0–5% color pulp is added thereinto, can readily form color antistatic material.

INDUSTRIAL APPLICABILITY

The followings are examples for the present invention.

1. Wall

① base layer: scrape the wall outer skin by chisel, use cotton filaments and dust-cleaner to remove the floating dusts, and fill up the unsmoothed portions using the filling material of the following ingredients (wt %): white cement 70, acrylic acid 15, gypsum powder 10, and HOA amide antistatic agent 5. After a duration of 8 hours for drying, fully scrape two times again using the above-indicated filling material.

② interlayer: the color antistatic interlayer wall material is used, the ingredients (wt %) of which read: ethylene glycol 6, sodium hexametaphosphate 6, talc powder 27, amide antistatic agent 4, color pulp 2, styreneacrylic emulsion 55. The spray-coat pressure is 0.5–0.8 MPa, the spray base is around 0.8–1 m, and the thickness of the spray layer is 0.3 mm. After a duration of 7 hours for drying, a layer with a thickness of 0.2 mm is again sprayed according the above-indicated process.

③ top layer: a transparent antistatic material is spray-coated, the ingredients (wt %) of which read: triethanolamine 6, gasoline 50, HOA antistatic agent 4, and base material silicon-acrylic resin 40. The pressure is 0.8 MPa, the spray base is 0.8–1 m, and the spray-coat thickness is 0.3 mm. After a duration of 8 hours for drying, a spray is carried out for the second time according to the requirement of the above-indicated process with a thickness of 0.1 mm.

2. Ceiling

① base layer: fill up and fully scrape for twice using the material same as the wall filling material.

② interlayer: the antistatic interlayer material for ceiling is stirred homogeneously at high speed, the ingredients (wt %) of which read: EVA 25, HOA amide antistatic agent 4, ethylene glycol 5, aqueous solution of polymethyl acrylic acid ammonium 6, silicon sand (30–100 mesh) 40, and pure water 20. Said material is then homogeneously spray-coated once at a spray base of 0.5–0.8 m using a gas pump with a pressure of 0.8–1 MPa, the thickness is 1 mml. After a duration of 26 hours for drying, the desired effect can be achieved.

③ top layer: it is obtained by spray-coating for twice using same process and material as those of wall top layer.

3. Ground

① base layer: the ground is cleared up and is filled up at unsmooth portions using filling material of identical concentration and stirred homogeneous, the ingredients (wt %) of which read: 107 gum 12, acrylic acid bottom sealing material 13, and white cement 75. After a duration of 10 hours for drying, the same material is used to fully scrape for the second time and after a duration of 10 hours for drying, sand paper is used for grinding away.

② interlayer: antistatic interlayer material for ground is used to roll-coat for once by a roll, the ingredients (wt %) of which read: acrylic acid resin 90, and HOA amide antistatic agent 10. The thickness of the coating layer obtained is 0.8 mm. After a duration of 6 hours for drying, another layer is roll-and brush-coated with a thickness of 0.4 mm, and dried for another 6 hours.

③ top layer: the first layer thereof is spray-coated with a thickness of 0.2 mm using 25% pure acrylic acid 94 and HOA amide antistatic agent 6. After a duration of 3 hours for drying, the second layer thereof is homogeneously spray-coated using same material and a spray gun of 0.8 MPa pressure at a spray base of 0.5–0.8 m.

4. Glass door or window

Transparent antistatic material is used, the ingredients (wt %) of which read: triethanolamine 4, gasoline 48, HOA amide antistatic agent 3, and silicon-acrylic resin base material 45. For the present embodiment, a 0.1 mm thick spray-coated layer is obtained by a spray gun with a pressure of 0.5 MPa at a spray base of 1–1.5 m. After being dried for 1 hour, another homogeneous coating layer with a thickness of 0.2 mm is made again using same pressure.

In comparison with the prior art, the bulk space antistatic method according to the present invention has the following effects.

I. Several layers or laminations of different antistatic materials are used to treat the walls, the ground, and the ceiling and in the filling material of the base layer there has already been added a certain amount of antistatic material to form a substrate of ionic type conduction performance having a better conduction of static electricity than that of the electronic type metal substrate. In this manner, the static electricity of the wall, the ground, and the ceiling polluted by static electricity can be neutralized and leaked during the reconstruction of older machine rooms polluted by static electricity, and the base layer has already certain antistatic performance. The interlayer uses antistatic material of desired color or decorative pattern, it is an antistatic thick coating layer forming a passage and bridge for the release and the leakage of static electricity from the surface to the base layer (the substrate), this middle coating layer possessing activity improves significantly the antistatic effect. The top layer uses color (transparency inclusive) antistatic material which can assure the whole color and achieve a satisfactory anti-surfacial electricity effect, more importantly, while employing the several layers and laminations of antistatic materials of the present invention, there can be achieved an automatic compenstation of the antistatic performance when the surface is damaged or the static electricity accumulates and the antistatic performance drops somewhat.

II. In the prior art, the release and the leakage of static electricity pertains to metallic electronic conduction, while the present invention employs non-metallic fully-ionized conduction, release, and leakage of static electricity.

III. The present invention uses the materials, the surface and the inner layers of which possess activity so that the static electricity can be easily released, leaked and eliminated without special antistatic apparatus, devices or antistatic electrical applicances, etc.

IV. In the present invention, multi-layer antistatic materials are applied on the wall, the ground, the ceiling, and the door or window partition or screening glass, these materials have the ability to permeate from the surface to the base layer substrate. When the method of the present invention is further employed, a stereo bulk space is formed by such a "stereo bulk space passage" is formed, the static electricity of the in-house space is rapidly and effectively released and leaked.

V. The multilayer antistatic material of the present invention possesses further the function of automatically recovering the antistatic performance which was locally damaged, therefore, embellishes and strengthens the antistatic effect of the stereo bulk space passage.

Along with the developement of microelectronic technology, the super high speed processor IC demands a higher and higher antistatic performance; the antistatic requirement of the most advanced super high speed processor is 12–15 Volts, the existing antistatic technology can hardly meet this requirement. The present invention has achieved the entire space antistatic performance, that is, 0–5 volts, which can effectively dispose or avoid the space static electricity and satisfy the antistatic requirement of the most advanced super-high speed processor.

For example, the space static electricity of a computer control machine room of a big firm is measured to be 330–884 volts before reconstruction; after using the method of the present invention to dispose the space static electricity, said static electricity is reduced to 0–3 volts.

Additionally, the space static electricity of a computer-controlled electrical system for the power supply of another big firm before reconstruction was 6000–10000 volts, said static electricity led to 25 accidents in average per year of the installation operation. After using the method of the present invention, the static electricity dropped to 0–5 volts, and no accident resulting from static electricity interference has occured for one year since it has operated.

We claim:

1. A method of preventing statics for bulk space structure, comprising:

forming said bulk space structure with antistatic wall(s), a ceiling and a ground, and at least one selected from glass doors and glass windows;

coating said wall(s), ceiling and ground of said bulk space structure with a multi-layer antistatic material wherein each of said wall(s), ceiling and ground comprises a base layer, an interlayer, and a top layer;

said base layer being prepared by clearing up surfaces of the wall(s), ceiling and ground, smoothing portions thereof by filling an antistatic filling material thereinto, and after a period of about 5 to about 10 hours, scraping the entire surface of the base layer smooth and compacting the same between 1 and 4 times;

said interlayer layer being prepared by spray-coating, brush-coating or roll-coating the base layer with an antistatic coating material, wherein the wet-thickness is about 0.3 to about 2 mm, drying for about 5 to about 26 hours, and repeating the interlayer layer coating up to four times;

said top layer being prepared by spray-coating, brush-coating or roll-coating the interlayer layer with an antistatic coating material, wherein the wet-thickness is about 0.1 to about 0.4 mm, drying for about 2.5 to about 8 hours, and repeating the top layer coating at least once to up to 5 times; and preparing at least one selected from glass doors and glass windows by roll-coating, spray-coating or brush-coating onto said at least one selected from glass doors and glass windows a transparent antistatic material, wherein the wet-thickness of about 0.1 to about 0.3 mm, drying for about 1 to about 3 hours, and repeating the transparent coating at least once to up to 8 times.

2. The method according to claim 1, wherein the antistatic filling material of said base layer for said wall(s) comprises 15–30 wt % acrylic acid, 4–6 wt % HOA amide antistatic agent, 8–12 wt % adhesive 107, and 55–73% white cement;

said color antistatic material of said interlayer for said wall(s) comprises 6–11 wt % ethylene glycol, 5–10 wt % sodium hexametaphosophate, 25–27 wt % talc powder, 4–5 wt % HOA amide antistatic agent, 1–3 wt % color pulp and 54–55 wt % styrene-acrylic emulsion; and a transparent antistatic material is used as a covering material at the material of said top layer of said wall(s).

3. The method according to claim 1, wherein said antistatic filling material of said base layer for said ground comprises 13–27 wt % acrylic acid emulsion, 4–6 wt % HOA amide antistatic agent, 8–12 wt % adhesive 107, and 55–73% white cement;

said antistatic material of said interlayer for said ground comprises 90–95 wt % acrylic acid resin and 5–10 wt % HOA amide antistatic agent; and said antistatic material of said top layer for ground comprises 93–95 wt % acrylic acid wherein the solid content thereof is above about 20%, and 5–7 wt % HOA amide antistatic agent.

4. The method according to claim 1, wherein said transparent antistatic material comprises 1–6 wt % of triethanol amine, 45–70 wt % of gasoline, 3–4 wt % of HOA antistatic agent, and 20–51 wt % silicone-acrylic resin base material.

5. The method according to claim 1, further comprising a antistatic floor, said floor comprising a base sheet having upper and lower sides enclosed by metal materials having a thickness of about 0.1 to 1 mm, said antistatic floor having a upper surface which is coated with an antistatic adhesive material having a thickness of about 0.5 to about 3 mm, said antistatic floor having through holes therein, said through holes being filled with antistatic rubber bars or metal materials, said through holes being evenly distributed.

6. The method according to claim 1, wherein said base layer comprises a non-metallic material.

7. The method according to claim 1, wherein said transparent antistatic material further comprises up to about 5 wt % pulp.

8. The method according to claim 1, wherein said antistatic filling material of said base layer for ceiling comprises 15–30 wt % acrylic acid, 4–6 wt % HOA amide antistatic agent, 8–12 wt % adhesive 107, and 55–73% white cement;

said antistatic material of said interlayer for said ceiling comprises 25–30 wt % ethylene-vinyl acetate, 3–4 wt % HOA amide antistatic agent, 1–5 wt % ethylene glycol, 1–6 wt % polymethylacrylic acid amino aqueous solution, 38–50 wt % silicon sand and 20–24 wt % pure water; and said antistatic material of said top layer for ceiling comprises 1–6 wt % triethanolamine, 45–70 wt % gasoline, 3–4 wt % HOA amide antistatic agent and 20–51 wt % silicone-acrylic resin base material.

9. A method of preventing statics for bulk space structure, comprising:

forming said bulk space structure by at least antistatic wall(s), a ceiling and a ground, and at least one selected from glass doors and glass windows, coating said wall(s), a ceiling and ground of said bulk space structure with a multi-layer antistatic material wherein each of said wall(s), ceiling and ground comprises a base layer, an interlayer, and a top layer, said base layer being prepared by clearing up surfaces of the wall(s), ceiling and ground, smoothing portions thereof by filling an antistatic filling material thereinto, and scraping the entire surface of the base layer smooth and compacting the same;

said interlayer layer being prepared by spray-coating, brush-coating or roll-coating the base layer with an antistatic coating material;

said top layer being prepared by spray-coating, brush-coating or roll-coating the interlayer layer with an antistatic coating material; and preparing at least one selected from glass doors and glass windows by roll-coating, spray-coating or brush-coating onto said at least one selected from glass doors and glass windows a transparent antistatic material; wherein the antistatic filling material of said base layer for said wall(s) comprises acrylic acid and HOA amide antistatic agent;

said antistatic material of said interlayer for said wall(s) comprises HOA amide antistatic agent; and a transparent antistatic material is used as a covering material at the material of said top layer of said wall(s).

\* \* \* \* \*